United States Patent
Park et al.

(10) Patent No.: US 12,200,502 B2
(45) Date of Patent: Jan. 14, 2025

(54) ELECTRONIC DEVICE PERFORMING INTERFERENCE CANCELLATION AND OPERATING METHOD THEREOF

(71) Applicant: SAMSUNG ELECTRONICS CO., LTD., Suwon-si (KR)

(72) Inventors: Jungmin Park, Seoul (KR); Jinho Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 537 days.

(21) Appl. No.: 17/456,192

(22) Filed: Nov. 23, 2021

(65) Prior Publication Data

US 2022/0182844 A1    Jun. 9, 2022

(30) Foreign Application Priority Data

Dec. 4, 2020   (KR) .................. 10-2020-0168725
May 10, 2021  (KR) .................. 10-2021-0060333

(51) Int. Cl.
  *H04W 24/10*   (2009.01)
  *H04L 5/00*    (2006.01)
  *H04L 5/14*    (2006.01)
  *H04W 4/06*    (2009.01)
  *H04W 16/14*   (2009.01)

(52) U.S. Cl.
  CPC .......... *H04W 16/14* (2013.01); *H04L 5/0051* (2013.01); *H04L 5/1469* (2013.01); *H04W 4/06* (2013.01); *H04W 24/10* (2013.01)

(58) Field of Classification Search
  CPC ....... H04W 16/14; H04W 4/06; H04W 24/10; H04L 5/0051; H04L 5/1469; H04L 5/005; H04J 11/005
  See application file for complete search history.

(56) References Cited

U.S. PATENT DOCUMENTS

| | | |
|---|---|---|
| 9,072,103 B2 | 6/2015 | Choi et al. |
| 9,392,391 B2 | 7/2016 | Luo |
| 9,648,510 B2 | 5/2017 | Seo et al. |
| 11,050,502 B2 | 6/2021 | Shin et al. |

(Continued)

FOREIGN PATENT DOCUMENTS

| | | |
|---|---|---|
| KR | 10-2018-0041347 | 4/2018 |
| KR | 10-2108080 | 4/2020 |
| WO | 2015157463 | 10/2015 |

OTHER PUBLICATIONS

Extended European Search Report dated Apr. 21, 2022 in corresponding European Application No. 21208952.8, 12 pages.

(Continued)

*Primary Examiner* — Chuong A Ngo
(74) *Attorney, Agent, or Firm* — Wolf, Greenfield & Sacks, P.C.

(57) ABSTRACT

The present disclosure provides an operating method of an electronic device supporting dynamic spectrum sharing (DSS). The method includes performing a radio resource control (RRC) connection with a serving base station, receiving information for interference cancellation from the serving base station, receiving a cell-specific reference signal (CRS) from at least one adjacent base station that is different from the serving base station, and performing interference cancellation based on the CRS and the information for the interference cancellation.

20 Claims, 7 Drawing Sheets

(56) References Cited

U.S. PATENT DOCUMENTS

| | | |
|---|---|---|
| 2015/0103683 A1 | 4/2015 | Kim et al. |
| 2017/0238206 A1* | 8/2017 | Hwang ................. H04L 5/0073 370/329 |
| 2018/0254797 A1 | 9/2018 | Amini et al. |
| 2020/0014481 A1 | 1/2020 | Chervyakov et al. |
| 2020/0053758 A1 | 2/2020 | Hosseini et al. |
| 2021/0127378 A1* | 4/2021 | Pezeshki ............... H04L 5/0051 |

OTHER PUBLICATIONS

"Scope Update For Rel-17 NR Demodulation Performance WI: CRS-IM for LTE/NR DSS", Intel Corporation, Dec. 7-11, 2022, 5 pages.

"NAICS Parameters", Ericsson, Aug. 18-22, 2014, 5 pages.

"WI Scope of Further Enhancement of NR Demodulation Performance", ZTE, Sanechips, Dec. 7-11, 2020, 4 pages.

* cited by examiner

ELECTRONIC DEVICE PERFORMING INTERFERENCE CANCELLATION AND OPERATING METHOD THEREOF

CROSS-REFERENCE TO RELATED APPLICATIONS

This application is based on and claims priority under 35 U.S.C. § 119 to Korean Patent Application Nos. 10-2020-0168725, filed on Dec. 4, 2020, and 10-2021-0060333, filed on May 10, 2021, in the Korean Intellectual Property Office, the disclosures of which are incorporated by reference herein in their entirety.

BACKGROUND

The inventive concept relates to an electronic device, and more particularly, to an electronic device performing interference cancellation and an operating method of the electronic device.

Wireless communication networks provide the ability for users, or devices, to transfer data between devices such as mobile phones, computers, and the like. Fifth-generation (5G) wireless communication systems provide high-speed data service compared to previous generations. 5G communication systems are designed to meet the increasing demand for wireless data traffic. For example, 5G communication system base stations may utilize beamforming, millimeter wave transmissions, or both. Therefore, 5G communication system base stations may be located near one another compared to previous radio access technologies.

In some cases, base stations cell-specific reference signals. These reference signals may interact or interfere with nearby base stations, causing a deterioration in reception and overall communication performance. Therefore, there is a need in the art to improve base station signals as to reduce an effect on other base station signals.

SUMMARY

The inventive concept provides an electronic device that effectively performs cell-specific reference signal (CRS) interference cancellation and an operating method of the electronic device.

According to an aspect of the inventive concept, there is provided an operating method of an electronic device supporting dynamic spectrum sharing (DSS), the operating method including performing a radio resource control (RRC) connection with a serving base station, receiving information for interference cancellation from the serving base station, receiving a cell-specific reference signal (CRS) from at least one adjacent base station that is different from the serving base station, and performing interference cancellation based on the CRS and the information for the interference cancellation.

According to another aspect of the inventive concept, there is provided an electronic device including a communicator configured to receive information for interference cancellation from a serving base station simultaneously supporting 5G and LTE and receive a cell-specific reference signal (CRS) from at least one adjacent base station supporting LTE, a storage configured to store predefined threshold value information, and a controller configured to perform a radio resource control (RRC) connection with the serving base station and perform interference cancellation based on the CRS and the information for the interference cancellation.

According to another aspect of the inventive concept, there is provided a wireless communication system including a first base station configured to simultaneously support 5G and LTE and transmit information for interference cancellation to an electronic device, a second base station configured to support LTE and broadcast a cell-specific reference signal (CRS) to the electronic device, and the electronic device including a communicator configured to receive the information for the interference cancellation and the CRS, a storage configured to store predefined threshold value information, and a controller configured to perform a radio resource control (RRC) connection with the first base station and perform interference cancellation based on the CRS and the information for the interference cancellation.

According to another aspect of the inventive concept, a method of wireless communication includes establishing a connection with a serving base station; while connected to the serving base station, performing a cell-specific reference signal (CRS) extraction process for an adjacent base station; measuring a CRS signal metric for the adjacent base station based on the CRS extraction process; determining whether the adjacent base station has transmitted a CRS signal based on whether the CRS signal metric exceeds a threshold value; and performing interference cancellation based on the determination.

BRIEF DESCRIPTION OF THE DRAWINGS

Embodiments of the inventive concept will be more clearly understood from the following detailed description taken in conjunction with the accompanying drawings in which.

DETAILED DESCRIPTION OF THE EMBODIMENTS

The present disclosure relates to an electronic device, and more particularly, to an electronic device capable of performing interference cancellation and an operating method of the electronic device. In some embodiments of the present disclosure, a terminal may identify a location of a signal symbol of a nearby base station by transmitting individual signal information about the nearby base station to the terminal in a connection process with a serving base station. As a result, interference may be eliminated.

5G communication systems have the ability to use a millimeter wave frequency (mmWave) band (e.g., a 60 gigahertz (60 GHz) band) to achieve a high data rate. Beamforming, massive multiple input multiple output (massive MIMO), full dimensional MIMO (FD-MIMO), array antenna, analog beamforming, digital beamforming, hybrid beamforming, and large-scale antenna technologies are used to alleviate the path loss of radio waves and increase the propagation distance of radio waves in the microwave frequency band, in the 5G communication system.

Base stations transmit reference signals as a normal operating procedure. The reference signals may interfere with nearby base station signals and may interfere with the nearby signals. Therefore, there may be a deterioration of signals from the base stations, which may reduce the reception performance and quality of a communication device.

The electronic device operating method of the present disclosure includes performing a radio resource control (RRC) connection with a serving base station, receiving information for interference cancellation from the serving base station, receiving a cell-specific reference signal (CRS) from at least one adjacent base station that is different from the serving base station, and performing interference cancellation based on the CRS and the information for the interference cancellation.

Hereinafter, example embodiments of the inventive concept will be described in detail with reference to the accompanying drawings.

Figure 1:
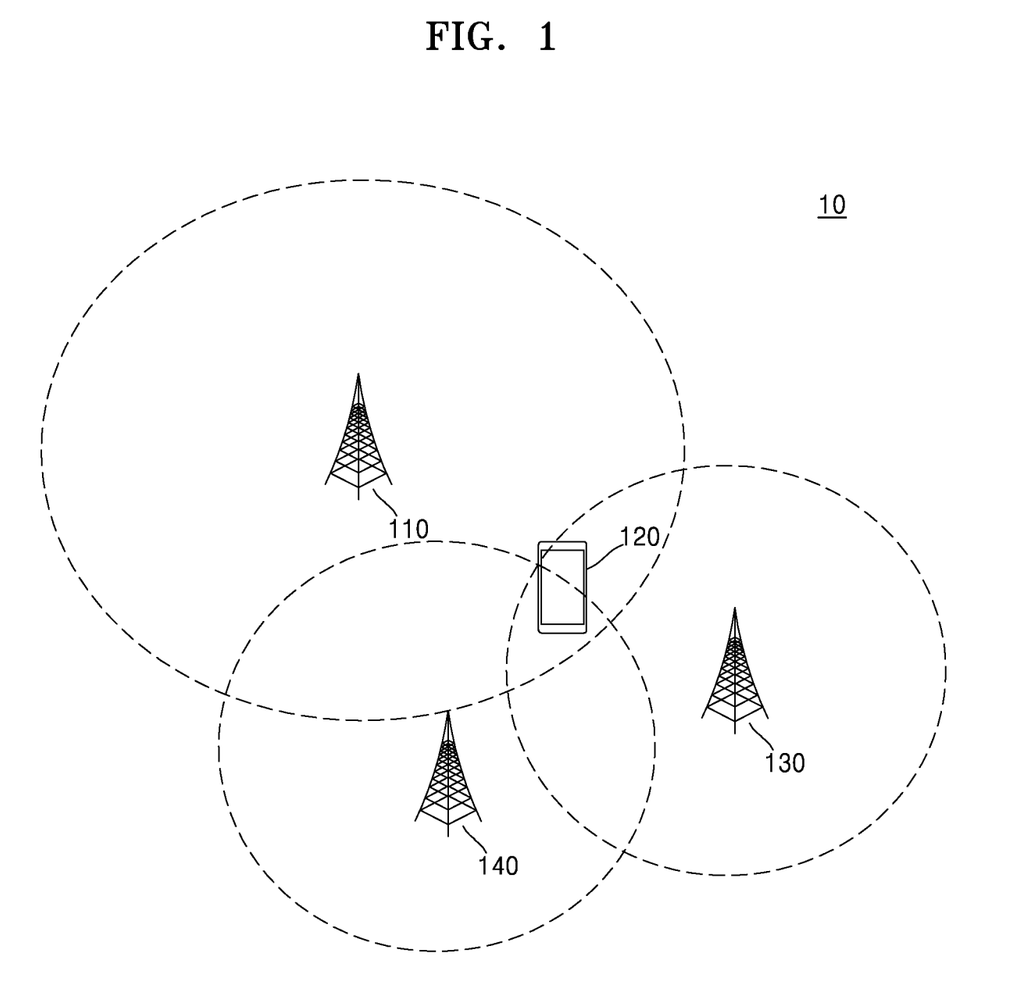
FIG. 1 illustrates a wireless communication system according to an example embodiment of the inventive concept.

FIG. 1 illustrates a wireless communication system according to an example embodiment of the inventive concept.

Referring to FIG. 1, the wireless communication system 10 may include a serving base station 110, an electronic device 120, a first adjacent base station 130, and a second adjacent base station 140.

According to various embodiments, the serving base station 110 is a network infrastructure that provides a wireless connection to the electronic device 120. The serving base station 110 may have coverage defined as a certain geographic area based on a distance to which a signal may be transmitted. The term 'base station' in the serving base station 110 may be replaced with 'access point (AP)', 'eNodeB (eNB)', '5th generation (5G) node', 'wireless point', or other terms with an equivalent technical meaning.

According to various embodiments, the serving base station 110 may be connected to one or more 'transmission/reception points (TRPs)'. The serving base station 110 may transmit a downlink signal to or receive an uplink signal from the electronic device 120 through one or more TRPs.

According to various embodiments, the electronic device 120 is a device used by a user and may communicate with the serving base station 110 through a wireless channel. The term 'electronic device' in the electronic device 120 may be replaced with 'user equipment (UE)', 'mobile station', 'subscriber station', 'customer premises equipment (CPE)', 'remote terminal', 'wireless terminal', 'user device', or other terms with an equivalent technical meaning.

According to various embodiments, the electronic device 120 and the serving base station 110 may support dynamic spectrum sharing. The serving base station 110 may transmit and receive signals through 5G new radio (NR) and LTE in the same frequency band as the electronic device 120. According to various embodiments, the first adjacent base station 130 and the second adjacent base station 140 may correspond to a base station supporting 4G LTE. The electronic device 120 may receive a downlink signal from the serving base station 110. At the same time, signals generated from the first adjacent base station 130 and the second adjacent base station 140 may be treated as a noise signal.

Figure 2:
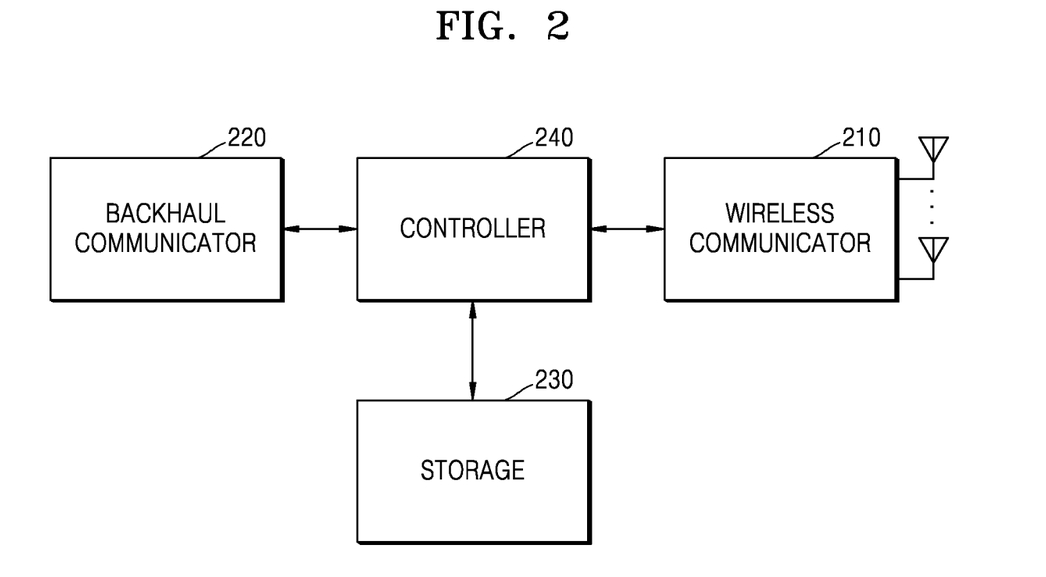
FIG. 2 is a block diagram of a serving base station according to example embodiments of the inventive concept.

FIG. 2 is a block diagram of the serving base station 110 of FIG. 1, according to example embodiments of the inventive concept.

Referring to FIG. 2, the serving base station 110 may include a wireless communicator 210, a backhaul communicator 220, a storage 230, and a controller 240.

The wireless communicator 210 may perform functions for transmitting and receiving signals through a wireless channel. According to an embodiment, the wireless communicator 210 may perform a conversion function between a baseband signal and a bitstream according to a physical layer standard of a system. For example, when transmitting data, the wireless communicator 210 may generate complex symbols by encoding and modulating a transmission bitstream. When receiving data, the wireless communicator 210 may restore a reception bitstream by demodulating and decoding a baseband signal. Additionally, or alternatively, the wireless communicator 210 may up-convert a baseband signal into a radio frequency (RF) band signal and then transmit the RF band signal through an antenna, or may down-convert an RF band signal received through the antenna into a baseband signal. To this end, the wireless communicator 210 may include a transmission filter, a reception filter, an amplifier, a mixer, an oscillator, a digital to analog converter (DAC), an analog to digital converter (ADC), and the like.

The wireless communicator 210 may transmit and receive signals. For example, the wireless communicator 210 may transmit a synchronization signal, a reference signal, system information, a message, control information, data, or the like. Additionally, or alternatively, the wireless communicator 210 may perform beamforming. The wireless communicator 210 may apply a beamforming weight to a signal to give directionality to the signal to be transmitted or received. The wireless communicator 210 may repeatedly transmit a signal by changing a formed beam.

The backhaul communicator 220 provides an interface for communicating with other nodes in the network. For example, the backhaul communicator 220 may convert a bitstream transmitted from the serving base station 110 to another node, for example, another access node, another base station, an upper node, a core network, etc. into a physical signal, and may convert a physical signal received from another node into a bitstream.

The storage 230 stores data such as a basic program, an application program, and configuration information for the operation of the serving base station 110. The storage 230 may be configured as a volatile memory, a non-volatile memory, or a combination of a volatile memory and a non-volatile memory. For example, the storage 230 may at least include a cell ID, an LTE bandwidth, an LTE center frequency location, multimedia broadcast single frequency network (MBSFN) configuration information, and time division duplex (TDD) configuration information of at least one base station adjacent to the serving base station 110.

The controller 240 controls operations of the serving base station 110. For example, the controller 240 transmits and receives signals through the wireless communicator 210 or the backhaul communicator 220. Additionally, or alternatively, the controller 240 writes data to the storage 230 and reads data from the storage 230. To this end, the controller 240 may include at least one processor.

Figure 3:
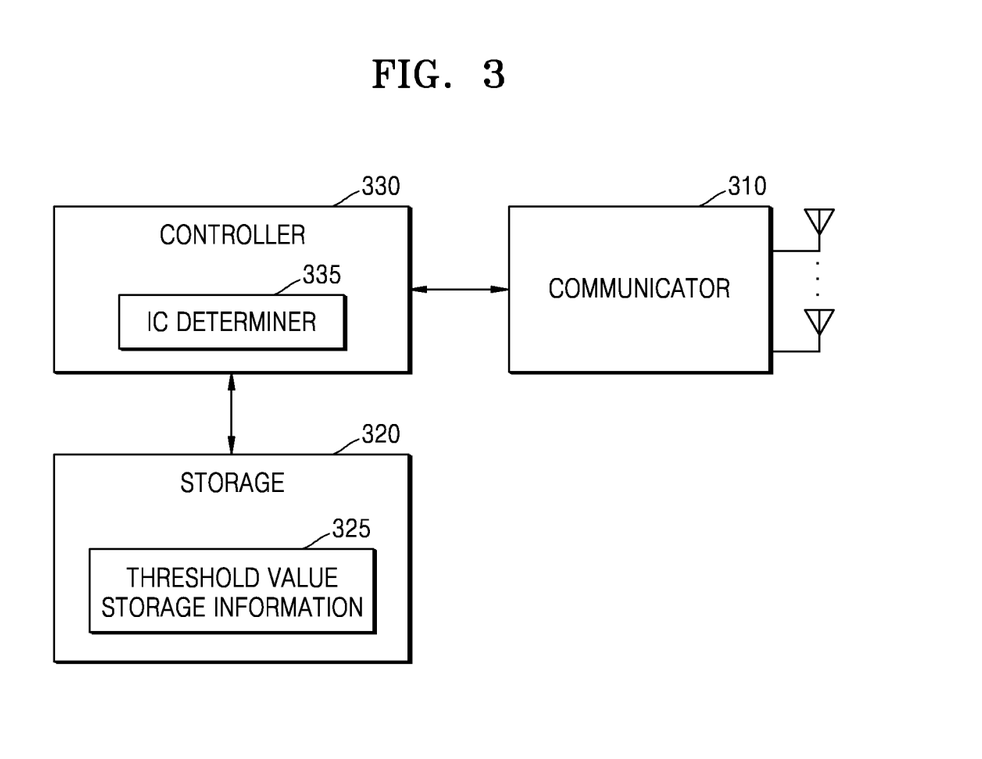
FIG. 3 is a block diagram of an electronic device according to example embodiments of the inventive concept.

FIG. 3 is a block diagram of the electronic device of FIG. 1, according to example embodiments of the inventive concept.

Referring to FIG. 3, the electronic device 120 may include a communicator 310, a storage 320, and a controller 330.

The communicator 310 performs functions for transmitting and receiving signals through a wireless channel. For example, the communicator 310 performs a conversion function between a baseband signal and a bitstream according to a physical layer standard of a system. For example, when transmitting data, the communicator 310 may generate complex symbols by encoding and modulating a transmission bitstream. When receiving data, the communicator 310 may restore a reception bitstream by demodulating and decoding a baseband signal. Additionally, or alternatively, the communicator 310 may up-convert a baseband signal into an RF band signal and then transmit the RF band signal through an antenna, or may down-convert an RF band signal received through the antenna into a baseband signal. For example, the communicator 310 may include a transmission filter, a reception filter, an amplifier, a mixer, an oscillator, a DAC, an ADC, and the like. The communicator 310 may perform beamforming. The communicator 310 may apply a beamforming weight to a signal to give directionality to the signal to be transmitted/received.

The communicator 310 may transmit and receive signals. The communicator 310 may receive a downlink signal. The downlink signal may include a synchronization signal (SS), a reference signal (RS), system information, a configuration message, control information, downlink data, or the like. Additionally, or alternatively, the communicator 310 may transmit an uplink signal. The uplink signal may include a random access-related signal or a reference signal (e.g., a sounding reference signal (SRS) or DeModulation Reference Signal (DM-RS)), or uplink data.

The storage 320 may store data such as a basic program, an application program, and configuration information for the operation of the electronic device 120. The storage 320 may be configured as a volatile memory, a non-volatile memory, or a combination of a volatile memory and a non-volatile memory. Additionally, or alternatively, the storage 320 may provide stored data according to the request of the controller 330.

According to various embodiments, the storage 320 may further include threshold value storage information. The threshold value may be a value for determining whether a cell-specific reference signal (CRS) symbol has been transmitted via a CRS signal received from at least one LTE base station adjacent to the electronic device 120. For example, the threshold value may be variable according to a measured strength of the CRS signal. The storage 320 may store the threshold value, which may be variable according to the measured strength of the CRS signal, as a predefined mapping relationship.

In some embodiments, a cell specific reference signal is transmitted from each downlink antenna port of a base station. The downlink cell specific reference signal can be used for cell search and initial acquisition, downlink channel quality measurements, downlink channel estimation for coherent demodulation/detection at the UE, and for other purposes.

The controller 330 may control overall operations of the electronic device 120. For example, the controller 330 may transmit and receive signals through the communicator 310.

Additionally, or alternatively, the controller 330 may write data to the storage 320 and read data from the storage 320. To this end, the controller 330 may include at least one processor or microprocessor, or may be a part of the processor. In the case in which the controller 330 is a part of the processor, a part of the communicator 310 and the controller 330 may be referred to as a communication processor (CP).

According to an embodiment, the controller 330 may further include an integrated circuit (IC) determiner 335. The IC determiner 335 may determine whether to perform interference cancellation based on at least one of a reception metric, a quality of service (QoS), and a service type. According to an embodiment, when the reception metric is less than a threshold value, the IC determiner 335 may transmit a control signal instructing the communicator 310 to perform interference cancellation. For example, the reception metric may at least include reference signal received power (RSRP), a signal to interference noise ratio (SINR), a received signal strength index (RSSI), and a received signal received quality (RSRQ). According to another embodiment, when the electronic device 120 executes an application using a higher QoS, the IC determiner 335 may transmit, to the communicator 310, a control signal instructing the communicator 310 to perform interference cancellation. In this case, the IC determiner 335 may generate the control signal even when the reception metric exceeds the threshold value.

In some embodiments, an interference cancellation technique include processing a received signal (e.g., a CRS signal) and estimating the inference based on the processing. The estimated interference can be subtracted from the desired signal component. Interference cancellation can be used for both inter-cell and intra-cell types of interference. In some examples, a signal received from an interfering base stations is first estimated by the receiver signal processing, and then subtracted from the received signal.

Figure 4A:
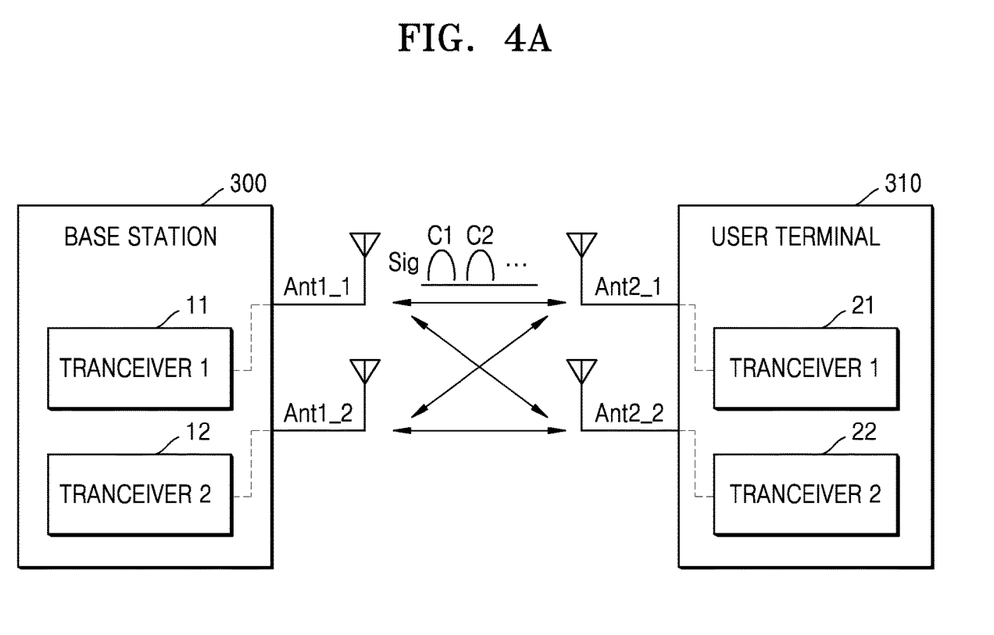
FIG. 4A illustrates an antenna port according to example embodiments of the inventive concept.

FIG. 4A illustrates an antenna port according to example embodiments of the inventive concept.

Referring to FIG. 4A, a base station 400 and an electronic device 410 may communicate with each other by using a multiple input multiple output (MIMO) scheme. To this end, the base station 400 and the electronic device 410 may include a plurality of antennas Ant1_1, Ant1_2, Ant2_1, and Ant2_2. In FIG. 4A, the base station 400 includes two antennas Ant1_1 and Ant1_2 and the electronic device 410 includes two antennas Ant2_1 and Ant2_2. However, the inventive concept is not limited thereto. For example, the inventive concept may be applied to an embodiment in which the base station 400 and the electronic device 410 each include two or more antennas.

The base station 400 may include a first transceiver 11, a second transceiver 12, a first antenna Ant1_1, and a second antenna Ant1_2. Each of the first transceiver 11 and the second transceiver 12 may be connected to one antenna. For example, the first transceiver 11 may be connected to the first antenna Ant1_1, and the second transceiver 12 may be connected to the second antenna Ant1_2. When the base station 400 operates as a transmitting device, the first transceiver 11 and the second transceiver 12 may operate as transmitters. When the base station 400 operates as a receiving device, the first transceiver 11 and the second transceiver 12 may operate as receivers.

The first transceiver 11 may generate a first signal Sig by merging a first component carrier signal C1 with a second component carrier signal C2 in a transmission mode and transmit the generated first signal Sig to the electronic device 410. The first transceiver 11 may extract the first component carrier signal C1 and the second component carrier signal C2 from the first signal Sig. Considering the base station 400 and the electronic device 410, which support dynamic spectrum sharing, the first component carrier signal C1 may be included in a 5G NR frequency band, and the second component carrier signal C2 may be included in an LTE frequency band. According to the inventive concept, each of the first transceiver 11 and the second transceiver 12 may merge and transmit a plurality of component carrier signals, rather than transmitting only one component carrier signal. Additionally, or alternatively, each of the first transceiver 11 and the second transceiver 12 may extract a plurality of component carrier signals, rather than extracting only one component carrier signal from the first signal Sig.

The electronic device 410 may include a third transceiver 21, a fourth transceiver 22, a third antenna Ant2_1, and a fourth antenna Ant2_2. Because the electronic device 410 may be substantially the same as or similar to the base station 400, a description thereof is omitted.

Figure 4B:
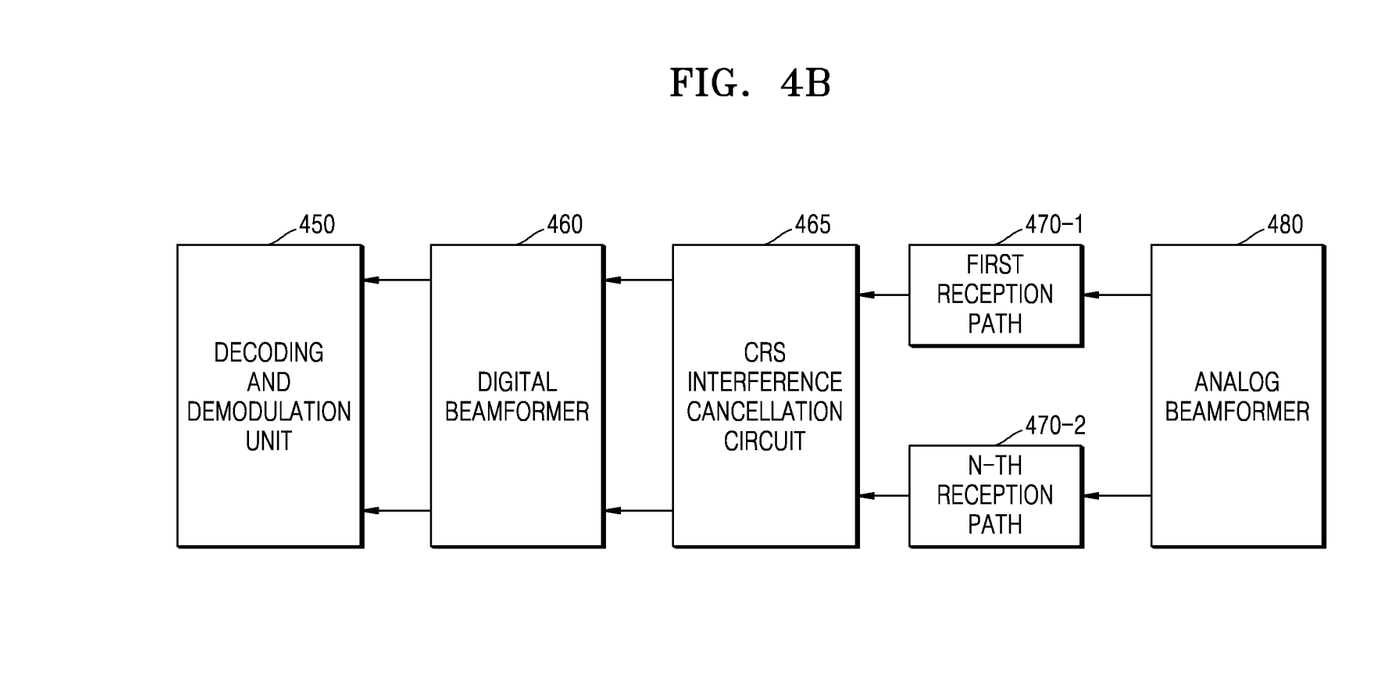
FIG. 4B illustrates a receive ratio frequency (RF) chain according to example embodiments of the inventive concept.

FIG. 4B illustrates a receive ratio frequency (RF) chain according to example embodiments of the inventive concept.

According to various embodiments, the communicator 310 of FIG. 3 may include a decoding and demodulation unit 450, a digital beamformer 460, a CRS interference cancellation circuit 465, a first reception path 470-1 to an N-th reception path (470-N), and an analog beamformer 480.

The decoding and demodulation unit 450 may perform channel decoding. For channel decoding, at least one of a low density parity check (LDPC) code, a convolution code, a polar code, and a turbo code may be used.

According to various embodiments, the digital beamformer 460 performs beamforming on a digital signal (e.g., modulation symbols). To this end, the digital beamformer 460 multiplies the modulation symbols by beamforming weights. In this case, the beamforming weights are used to change the magnitude and phase of a signal, and may be referred to as a 'precoding matrix', a 'precoder', or the like. The analog beamformer 480 performs beamforming on an analog signal. To this end, the analog beamformer 480 multiplies analog signals by beamforming weights. In this case, the beamforming weights are used to change the magnitude and phase of a signal.

The first reception path 470-1 to the N-th reception path 470-N may convert analog signals into digital signals. To this end, each of the first reception path 470-1 to the N-th reception path 470-N may include a fast Fourier transform (FFT) operator, an analog-to-digital converter, a Cyclic Prefix (CP) remover, a serial-parallel converter, and a down converter. Each of the first reception path 470-1 to the N-th reception path 470-N may down-convert a received signal to a baseband frequency and remove a CP to generate a serial time domain baseband signal. Additionally, or alternatively, each of the first reception path 470-1 to the N-th reception path 470-N may convert the serial time domain baseband signal into parallel time domain signals, perform an FFT algorithm to generate N parallel frequency domain signals, and convert the parallel frequency domain signals into a sequence of modulated data symbols. For example, the first reception path 470-1 to the N-th reception path 470-N may provide an independent signal processing process for a plurality of streams generated through digital beamforming. However, depending on an implementation method, some of the components of the first reception path 470-1 to the N-th reception path 470-N may be used in common.

The CRS interference cancellation circuit 465 may receive FFT-converted frequency domain signals to extract an LTE CRS symbol, may measure a signal strength through channel estimation for an LTE CRS, and may remove an LTE CRS symbol included in a received signal when the LTE CRS symbol is present. The CRS interference cancellation circuit 465 is described in detail below with reference to FIG. 5.

Figure 5:
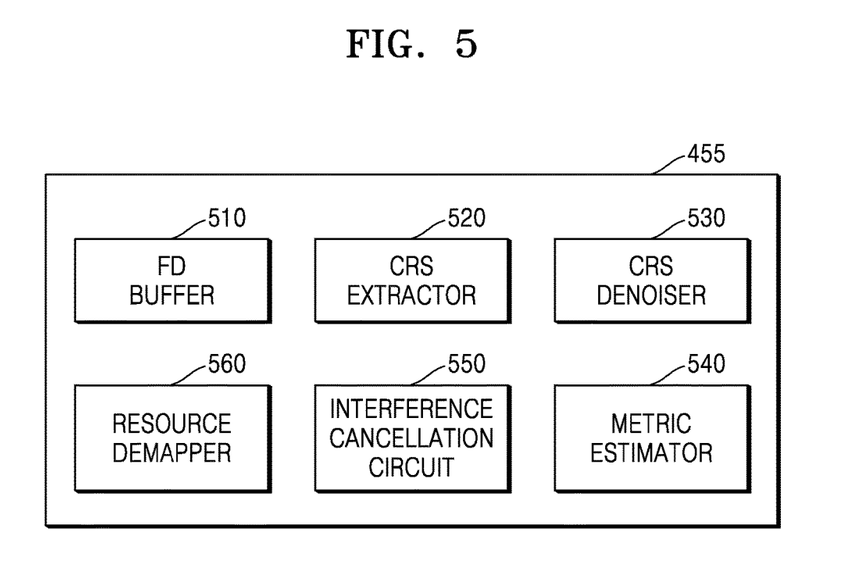
FIG. 5 is a block diagram of a cell-specific reference signal (CRS) interference cancellation circuit according to example embodiments of the inventive concept.

FIG. 5 is a block diagram of a CRS interference cancellation circuit 465 according to example embodiments of the inventive concept.

Referring to FIG. 5, the CRS interference cancellation circuit 465 may include a frequency domain (FD) buffer 510, a CRS extractor 520, a CRS denoiser 530, a metric measurer 540, an interference cancellation circuit 550, and a resource element (RE) demapper 560.

The FD buffer 510 may receive an FFT-converted signal. For example, the FD buffer 510 may receive and temporarily store an FFT-converted frequency domain signal from the first reception path 470-1 to the N-th reception path 470-N shown in FIG. 4B. The FFT-converted frequency domain signal may be as follows.

$$Y = H_{serv}X_{serv} + H_{CRS}X_{CRS} + N \quad (1)$$

Y denotes a reception signal in a frequency domain, obtained by FFT conversion of a received analog signal, $H_{serv}X_{serv}$ denotes a downlink signal received from a serving cell, $H_{CRS}X_{CRS}$ denotes a CRS signal received from an adjacent cell, and N denotes a noise signal. Referring to FIG. 1, the serving cell may correspond to the serving base station 110, and the adjacent cell may correspond to the first adjacent base station 130 and/or the second adjacent base station 140. The noise signal may include thermal noise and white Gaussian noise.

According to various embodiments, the CRS extractor 520 may receive the FFT-converted reception signal Y from the FD buffer 510 and generate a Y' signal by multiplying the FFT-converted reception signal Y by the complex conjugate of the CRS signal. According to various embodiments, the CRS denoiser 530 may perform channel estimation on the CRS signal. The CRS denoiser 530 may generate a y' signal by performing inverse fast Fourier transform (IFFT) conversion on the Y' signal. The metric measurer 540 may receive the IFFT-converted signal y' and measure a metric. The metric may correspond to one of SINR, RSRP, RSRQ, and RSSI. The metric measurer 540 may determine whether a CRS symbol has been transmitted by measuring a reception metric and performing a comparison with a threshold value. The RE demapper 560 may demap a resource element for each carrier constituting a received signal.

Figure 6:
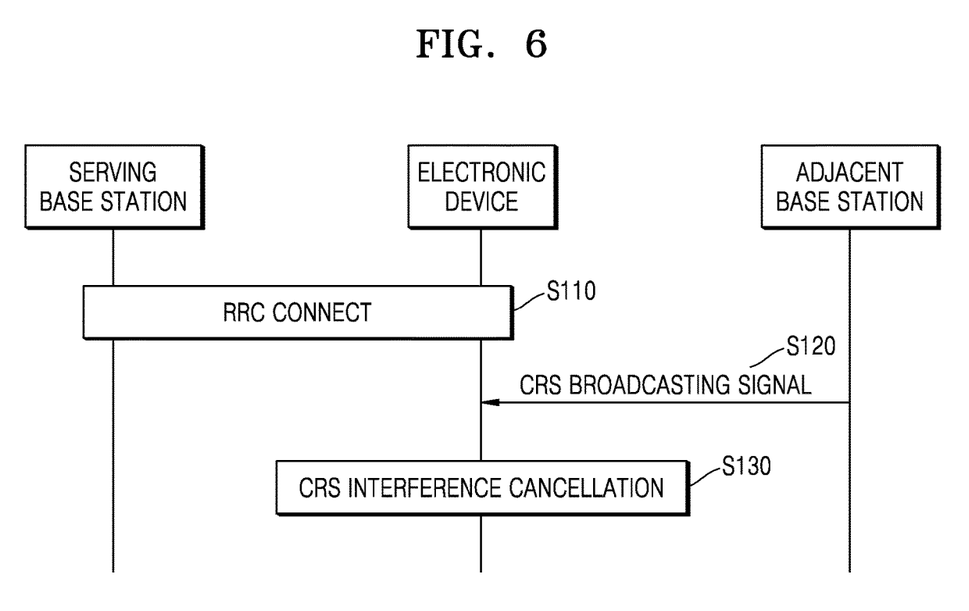
FIG. 6 is a signal exchange diagram for transmitting and receiving cell-specific information according to example embodiments of the inventive concept.

FIG. 6 is a signal exchange diagram for transmitting and receiving cell-specific information according to example embodiments of the inventive concept.

Referring to FIGS. 6 and 1 together, in operation S110, the electronic device 120 may perform radio resource control (RRC) connection with the serving base station 110. In a dynamic spectrum sharing (DSS) scenario, the electronic device 120 may identify resource mapping of an LTE CRS transmitted by the serving base station 110 through a New Radio Physical Downlink Shared CHannel (NR PDSCH) received from the serving base station 110. Referring to 3GPP technical specification (TS) 38.331, information transmitted from the serving base station 110 to the electronic device 120 is shown in Table 1 below.

TABLE 1

RateMatchPatternLTE-CRS information element

```
-- ASN1START
-- TAG-RATEMATCHPATTERNLTE-CRS-START
RateMatchPatternLTE-CRS ::=     SEQUENCE {
    carrierFreqDL    INTEGER (0 ... 16383),
    carrierBandwidthDL    ENUMERATED
{n6, n15, n25, n50, n75, n100, spare2, spare1},
    mbsfn-SubframeConfigList    EUTRA-MBSFN-SubframeConfigList
OPTIONAL, --Need M
    nrofCRS-Ports    ENUMERATED {n1, n2, n4},
    v-Shift    ENUMERATED {n0, n1, n2, n3, n4, n5}
}
LTE-CRS-PatternList-r16 ::=    SEQUENCE (SIZE
(1 ... maxLTE-CRS-Patterns-r16)) OF RateMatchPatternLTE-CRS
-- TAG-RATEMATCHPATTERNLTE-CRS-STOP
-- ASN1STOP
```

Referring to Table 1, the electronic device 120 may receive an LTE bandwidth, an LTE center frequency location, the number of CRS ports, a frequency shift parameter v_shift value, and MBSFN configuration information from the serving base station 110. The electronic device 120 may perform rate matching by accurately identifying a location to which a resource element of an LTE CRS transmitted from the serving base station 110 RRC-connected to the electronic device 120 is mapped based on the received information.

According to various embodiments, the serving base station 110 may transmit individual cell information to the electronic device 120 upon RRC connection. The individual cell information may refer to information on at least one base station adjacent to the electronic device 120. The individual cell information may be information for the electronic device 120 to identify resource mapping of an LTE CRS transmitted from an adjacent base station.

Based on the individual cell information, the serving base station 110 may transmit, to the electronic device 120, an LTE bandwidth, an LTE center frequency location, the number of CRS ports, a frequency shift parameter v_shift value, and MBSFN configuration information of each of adjacent base stations. The electronic device 120 may decode the individual cell information to identify a location to which a resource element of an LTE CRS transmitted by adjacent base stations to the electronic device 120 is mapped.

For example, referring to FIG. 1, the serving base station 110 may transmit at least one of an LTE bandwidth, an LTE center frequency location, the number of CRS ports, a frequency shift parameter v_shift value, and MBSFN configuration information of the first adjacent base station 130 together with the cell ID of the first adjacent base station 130, and at least one of an LTE bandwidth, an LTE center frequency location, the number of CRS ports, a frequency shift parameter v_shift value, and MBSFN configuration information of the second adjacent base station 140 together with the cell ID of the second adjacent base station 140.

According to various embodiments, the serving base station 110 may transmit common cell information to the electronic device 120 upon RRC connection. The common cell information may refer to information common to at least one base station adjacent to the electronic device 120. The common cell information may be information for the electronic device 120 to identify resource mapping of an LTE CRS transmitted from an adjacent base station.

Referring to the 3GPP standard, TS 36.331, RRC information on an adjacent base station is shown in Table 2 below.

TABLE 2

MeasObjectEUTRA information element

```
-- ASN1START
MeasObjectEUTRA ::=    SEQUENCE {
    carrierFreq    ARFCN-ValueEUTRA,
    allowedMeasBandwidth    AllowedMeasBandwidth,
    presenceAntennaPort1    PresenceAntennaPort1,
    neighCellConfig    NeighCellConfig,
    offsetFreq    Q-OffsetRange    DEFAULT dB0,
    -- Cell list
    cellsToRemoveList    CellIndexList    OPTIONAL,
    -- Need ON
    cellsToAddModList    Cells ToAddModList
OPTIONAL, -- Need ON
    -- Black list
    blackCellsToRemoveList    CellIndexList    OPTIONAL,
    -- Need ON
    blackCellsToAddModList    BlackCellsToAddModList
OPTIONAL, -- Need ON
    cellForWhichToReportCGI    PhysCellId
        OPTIONAL,    -- Need ON
```

Referring to Table 2, the common cell information is for transmitting minimum information on adjacent base stations, and may at least include, for example, AllowedMeasBandwidth information, PresenceAntennaPort1 information, and NeighCellConfig information.

The AllowedMeasBandwidth information may refer to a maximum LTE bandwidth value allowed for measurement at a frequency in which a DSS scenario is operating. The PresenceAntennaPort1 information may indicate whether a CRS port1 is used by adjacent base stations. The NeighCellConfig information may indicate whether pieces of MBSFN configuration information of adjacent base stations are the same as or different from each other, or whether there is no MBSFN configuration information. Alternatively, the NeighCellConfig information may indicate whether pieces of TDD UL/DL allocation information of adjacent base stations are the same as each other.

When the serving base station 110 transmits common cell information to the electronic device 120, the electronic device 120 may not identify resource mapping of a CRS symbol of an LTE CRS transmitted from an adjacent base station. This is because, because the common cell information is minimum information common between adjacent base stations, MBSFN configuration information and the number of CRS ports may be different between the adjacent base stations. For example, when the MBSFN configuration information of the serving base station 110 and the MBSFN configuration information of the first adjacent base station 130 are different from each other, a CRS symbol transmitted from the first adjacent base station 130 may not be identified.

In operation S120, an adjacent base station may broadcast the LTE CRS. An adjacent base station supporting LTE may configure an MBSFN sub-frame so that the serving base station 110 of 5G NR may periodically transmit a synchronization signal block.

In operation S130, the electronic device 120 may perform CRS interference cancellation. According to various embodiments, when individual cell information is received from the serving base station 110, interference cancellation for an LTE CRS may be performed using a center frequency location, an LTE bandwidth, the number of CRS ports, a frequency shift parameter v_shift value, and MBSFN configuration information of an adjacent base station. According to various embodiments, when common cell information is received from the serving base station 110, interference cancellation for an LTE CRS may not be immediately performed based on the common cell information. Therefore, because the number of CRS ports and CRS symbol information are unknown, embodiment of the present disclosure may determine whether a CRS symbol has been transmitted. This operation is described below with reference to FIG. 7.

Accordingly, a method of wireless communication includes establishing a connection with a serving base station; while connected to the serving base station, performing a cell-specific reference signal (CRS) extraction process for an adjacent base station; measuring a CRS signal metric for the adjacent base station based on the CRS extraction process; determining whether the adjacent base station has transmitted a CRS signal based on whether the CRS signal metric exceeds a threshold value; and performing interference cancellation based on the determination.

Figure 7:
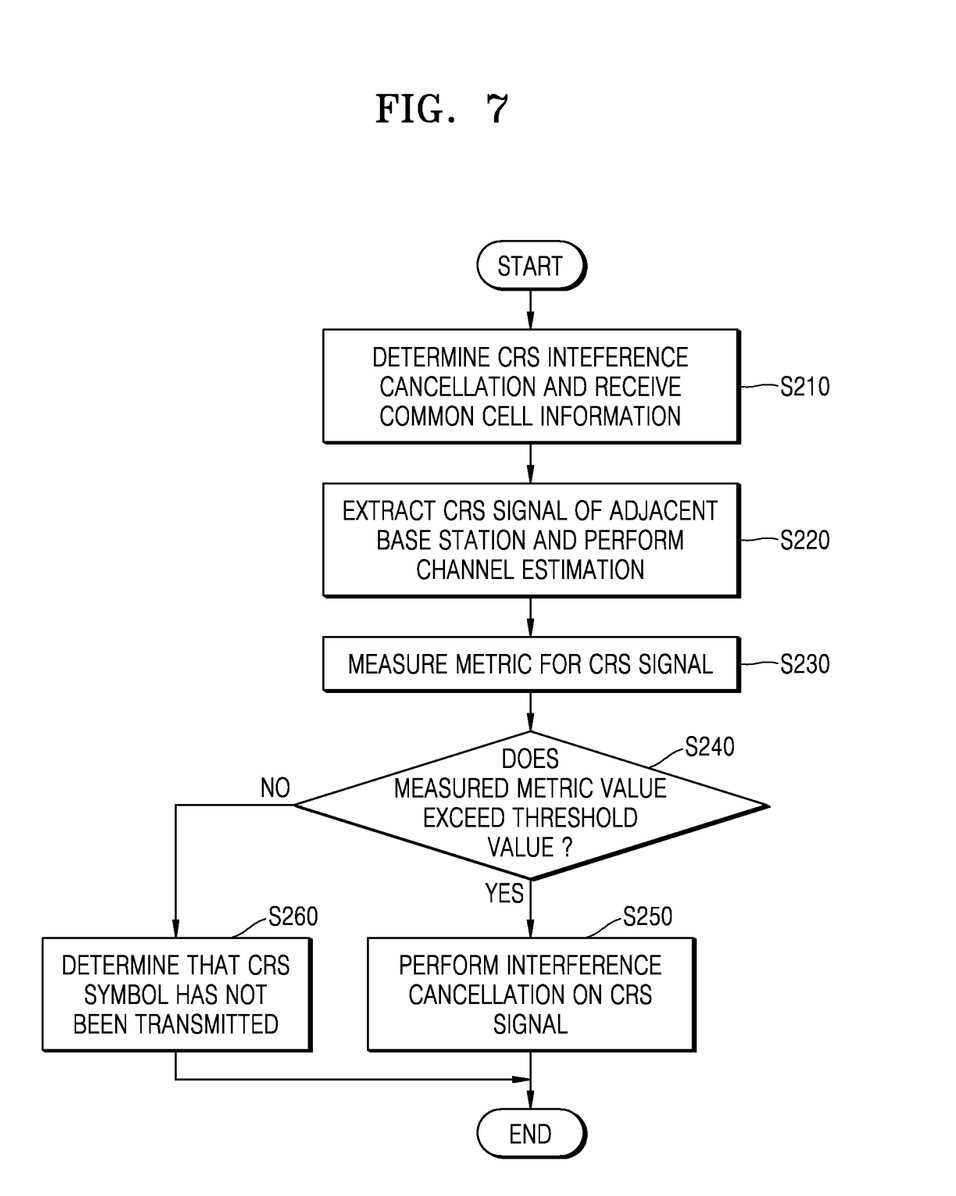
FIG. 7 is a flowchart illustrating an operation of an electronic device according to example embodiments of the inventive concept.

FIG. 7 is a flowchart illustrating an operation of an electronic device according to example embodiments of the inventive concept.

Referring to FIG. 7, in operation S210, the electronic device 120 of FIG. 1 may perform an RRC connection with the serving base station 110 and obtain interference cancellation information. As described above with reference to FIG. 6, the individual cell information may include a center frequency location, an LTE bandwidth, the number of CRS ports, a frequency shift parameter v_shift value, and MBSFN configuration information of each of a plurality of base stations adjacent to the electronic device 120. However, in this case, because the mapping location of a resource element of an LTE CRS received from adjacent base stations may be accurately identified, it is not necessary to determine whether a CRS symbol has been transmitted.

According to various embodiments, when receiving common cell information from the serving base station 110, the electronic device 120 may not effectively perform interference cancellation of a received LTE CRS. For example, when a TDD configuration or an MBSFN configuration is different between the serving base station 110 and the first adjacent base station 130, the electronic device 120 may not have determined information about a transmission symbol of an LTE CRS received from the first adjacent base station 130. Because the information about the transmission symbol of the LTE CRS received from the first adjacent base station 130 has not been determined, it may be difficult for the electronic device 120 to perform a CRS interference cancellation operation for the first adjacent base station 130. Additionally or alternatively, in the case of the number of CRS ports among the common cell information, a minimum value may be indicated in some or all of the adjacent LTE cells. Accordingly, when the number of CRS ports of the first adjacent base station 130 is 4 and the number of CRS ports indicated by the common cell information is 2, interference cancellation of an LTE CRS broadcasted to the electronic device 120 through the four CRS ports of the first adjacent base station 130 may be ineffective. Accordingly, the electronic device 120 may determine whether a CRS symbol has been transmitted.

In operation S220, the electronic device 120 may extract a CRS signal and perform channel estimation on the CRS signal. Referring to FIG. 5, the electronic device 120 may FFT-convert a received analog signal and store an FFT-converted signal in the FD buffer 510, and may perform channel estimation on the CRS signal based on the CRS extractor 520 and the CRS denoiser 530.

In operation S230, the electronic device 120 may measure a reception metric for the CRS signal. The reception metric may correspond to one of SINR, RSRP, RSRQ, and RSSI. The reception metric may be a value for determining whether a CRS symbol has been transmitted from at least one adjacent base station adjacent to the electronic device 120. This is because, when a CRS symbol has been transmitted from at least one adjacent base station, a reception metric such as SINR may indicate a certain size or more.

In operation S240, the electronic device 120 may determine whether a measured metric value exceeds a threshold value. The threshold value may be a value for determining whether a CRS symbol has been transmitted. According to various embodiments, the threshold value may be variable based on a measured reception metric value. For example, when a measured SINR value is small, the strength of a CRS signal received by the electronic device 120 from an adjacent base station may be determined to be weak. Because the strength of the CRS signal is weak, an improvement in reception performance of the electronic device 120 may be small even when interference cancellation is performed on the CRS signal. Accordingly, the threshold value may be set larger as the measured reception metric value decreases. As another example, when a measured SINR value is large, the strength of a CRS signal received by the electronic device 120 from an adjacent base station may be determined to be strong. For example, because the width of the reception performance of the electronic device 120 that is improved when interference with a CRS signal is removed is large, the electronic device 120 may determine that a CRS symbol has been transmitted by setting the threshold value variably small.

In operation S250, the electronic device 120 may perform interference cancellation on a CRS signal. The electronic device 120 may identify that a CRS symbol has been transmitted. The electronic device 120 may perform interference cancellation on an LTE CRS based on a value for a CRS channel estimated in operation S220.

In operation S260, the electronic device 120 may identify that a CRS symbol has not been transmitted. Because the measured reception metric value is less than the threshold value, the electronic device 120 may determine that a CRS symbol has not been transmitted. Because a CRS symbol has not been transmitted, the electronic device 120 may bypass CRS interference cancellation.

Although the above-described embodiment has been described based on that the electronic device 120 performs operation S240 of determining whether a measured metric value exceeds the threshold value, the inventive concept is not limited thereto. According to various embodiments, the electronic device 120 may offline test whether a CRS symbol has been transmitted. For example, assuming that a CRS symbol is always transmitted, the electronic device 120 may bypass an operation of comparing a measured metric value with the threshold value. In this case, the electronic device 120 may use a different metric value. The electronic device 120 may bypass an online test for comparing a currently obtained metric value with the threshold value that is the electronic device 120 may estimate that the number of CRS ports, MBSFN configuration information, etc. determined according to a different metric value are the same as those according to the currently obtained metric value.

Figure 8:
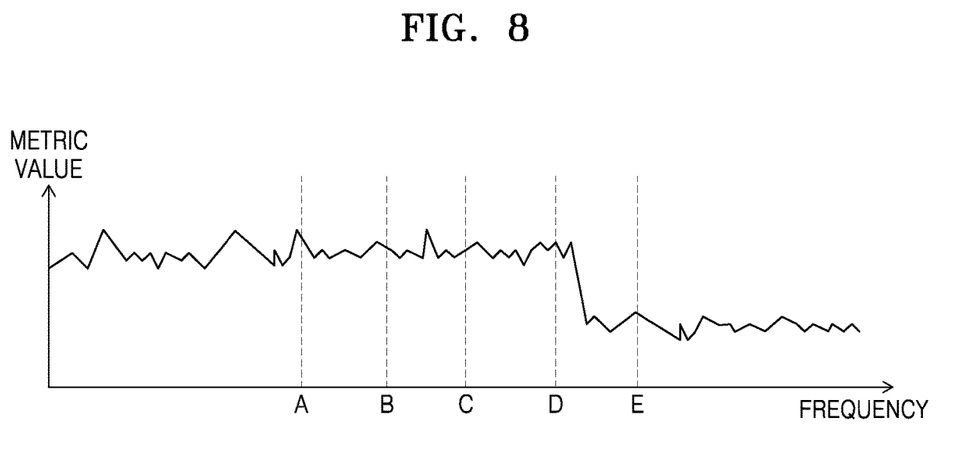
FIG. 8 is a graph illustrating a change in a metric value according to frequency, according to example embodiments of the inventive concept.

FIG. 8 is a graph illustrating a change in a metric value according to frequency, according to example embodiments of the inventive concept.

Referring to FIG. 8, a metric value according to frequency bands is shown. The electronic device 120 may not obtain information about an LTE bandwidth of an adjacent base station of Table 1 from the serving base station 110.

To indirectly estimate an LTE bandwidth of an adjacent base station, the electronic device 120 may repeatedly perform metric measurement from a low LTE bandwidth. Referring to FIG. 8, the metric value may be determined to be reduced in a frequency D to frequency E band.

This may be understood that the metric value is reduced because a CRS symbol has been transmitted in a frequency A to frequency D band and a CRS symbol has not been transmitted in the frequency D to frequency E band. Accordingly, when the electronic device 120 fails to obtain LTE bandwidth information on an adjacent base station, the electronic device 120 may perform iteration according to an increasing order of an LTE bandwidth value and estimate that the LTE bandwidth of an adjacent base station is up to bandwidth of a previous section in which the metric value is reduced the most.

Figure 9:
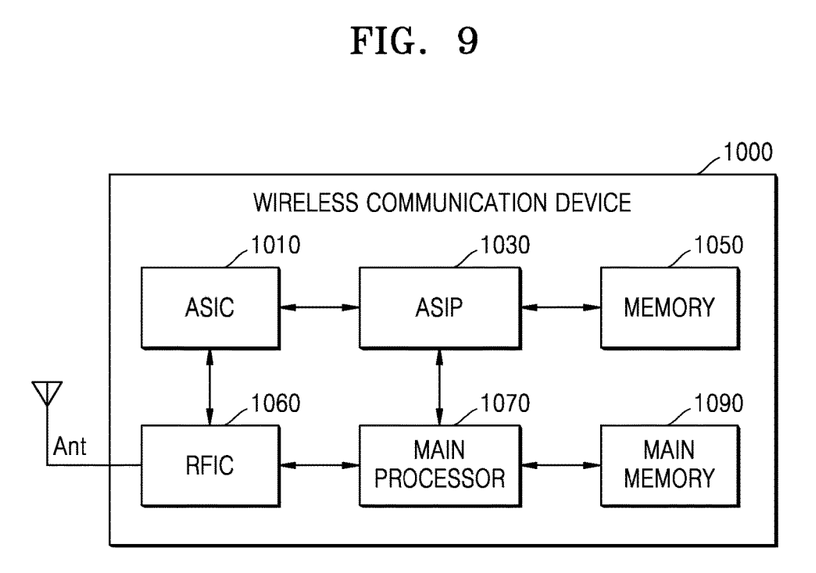
FIG. 9 is a block diagram of a wireless communication device according to example embodiments of the inventive concept.

FIG. 9 is a block diagram of a wireless communication device 1000 according to an example embodiment of the inventive concept.

Referring to FIG. 9, the wireless communication device 1000 may include a modem and a radio frequency integrated circuit (RFIC) 1060, and the modem may include an application specific integrated circuit (ASIC) 1010, an application specific instruction set processor (ASIP) 1030, a memory 1050, a main processor 1070, and a main memory 1090. The wireless communication device 1000 of FIG. 9 may be the electronic device 120 according to an embodiment of the inventive concept.

The RFIC 1060 may be connected to an antenna Ant to receive a signal from the outside or transmit a signal to the outside by using a wireless communication network. The RFIC 1060 may include the CRS interference cancellation circuit 465 described above with reference to FIGS. 2 to 8B. According to the inventive concept, the RFIC 1060 may receive individual cell information from the serving base station 110 and effectively perform interference cancellation for an LTE CRS transmitted by each of the adjacent base stations. Additionally, or alternatively, the RFIC 1060 may receive common cell information, determine whether each of the adjacent base stations actually transmits a CRS symbol, and perform interference cancellation for an LTE CRS.

The ASIP 1030 is an integrated circuit customized for a specific use, and may support a dedicated instruction set for a specific application and may execute instructions in the instruction set. The memory 1050 may communicate with the ASIP 1030 and may store a plurality of instructions, which may be executed by the ASIP 1030, as a non-transitory storage device. For example, the memory 1050 may include, as non-limiting examples, any type of memory accessible by the ASIP 1030, such as, random access memory (RAM), read only memory (ROM), tape, a magnetic disk, an optical disk, volatile memory, non-volatile memory, and a combination thereof.

The main processor 1070 may control the wireless communication device 1000 by executing the plurality of instructions. For example, the main processor 1070 may control the ASIC 1010 and the ASIP 1030, and may process data received through a wireless communication network or process a user's input to the wireless communication device 1000. The main memory 1090 may communicate with the main processor 1070 and may store a plurality of instructions, which may be executed by the main processor 1070, as a non-transitory storage device. For example, the main memory 1090 may include, as non-limiting examples, any type of memory accessible by the main processor 1070, such as RAM, ROM, tape, a magnetic disk, an optical disk, volatile memory, non-volatile memory, and a combination thereof.

While the inventive concept has been particularly shown and described with reference to embodiments thereof, it will be understood that various changes in form and details may be made therein without departing from the spirit and scope of the following claims.

What is claimed is:

1. An operating method of an electronic device supporting dynamic spectrum sharing (DSS), the operating method comprising:
    performing a radio resource control (RRC) connection with a serving base station;
    receiving information for interference cancellation from the serving base station, the information for interference cancellation comprising common cell information that is common to the serving base station and at least one adjacent base station;
    receiving a cell-specific reference signal (CRS) directly from the at least one adjacent base station that is different from the serving base station; and
    performing the interference cancellation based on the CRS and the information for the interference cancellation comprising the common cell information.

2. The operating method of claim 1, wherein the information for the interference cancellation corresponds to individual cell information at least including a long term evolution (LTE) bandwidth, a number of CRS ports, multimedia broadcast signal frequency network (MBSFN) configuration information, and time division duplex (TDD) configuration information for the at least one adjacent base station.

3. The operating method claim 2, wherein the performing of the interference cancellation includes:
    identifying a transmission location of a CRS symbol received from the at least one adjacent base station, based on the individual cell information; and
    performing interference cancellation based on the identified transmission location.

4. The operating method of claim 1, wherein the information for the interference cancellation corresponds to common cell information at least including first information indicating a maximum long term evolution (LTE) bandwidth value allowed for the at least one adjacent base station, second information indicating whether to use a CRS port of the at least one adjacent base station, third information indicating whether pieces of multimedia broadcast signal frequency network (MBSFN) configuration information of the at least one adjacent base station are the same as each other, and fourth information indicating whether pieces of time division duplex (TDD) configuration information of the at least one adjacent base station are the same as each other.

5. The operating method of claim 4, wherein the performing of the interference cancellation includes:
    performing channel estimation for the CRS based on the common cell information; and
    measuring a reception metric for the CRS.

6. The operating method of claim 5, wherein the reception metric corresponds to one of reference signal received power (RSRP), a signal to interference noise ratio (SINR), a received signal strength index (RSSI), and a received signal received quality (RSRQ).

7. The operating method of claim 5, further comprising:
    comparing the measured reception metric with a threshold value; and when the measured reception metric exceeds the threshold value, determining that a CRS symbol has been transmitted and performing interference cancellation on the CRS symbol.

8. The operating method of claim 7, wherein, when the measured reception metric is less than the threshold value, determining that the CRS symbol has not been transmitted and bypassing the interference cancellation for the CRS symbol.

9. The operating method of claim 1, wherein the serving base station supports both 5th generation new radio (5G NR) and long term evolution (LTE), and
the at least one adjacent base station supports LTE.

10. An electronic device comprising:
a communicator configured to receive information for interference cancellation from a serving base station simultaneously supporting 5G and long term evolution (LTE), the information for interference cancellation comprising common cell information that is common to the serving base station and at least one adjacent base station, and receive a cell-specific reference signal (CRS) directly from the at least one adjacent base station supporting LTE;
a storage configured to store predefined threshold value information; and
a controller configured to perform a radio resource control (RRC) connection with the serving base station and perform the interference cancellation based on the CRS and the information for the interference cancellation comprising the common cell information.

11. The electronic device of claim 10, wherein the information for the interference cancellation corresponds to individual cell information at least including an LTE bandwidth, a number of CRS ports, multimedia broadcast signal frequency network (MBSFN) configuration information, and time division duplex (TDD) configuration information for the at least one adjacent base station.

12. The electronic device of claim 11, wherein the controller is further configured to identify a transmission location of a CRS symbol received from the at least one adjacent base station, based on the individual cell information, and perform interference cancellation based on the identified transmission location.

13. The electronic device of claim 10, wherein the common cell information includes at least first information indicating a maximum LTE bandwidth value allowed for the at least one adjacent base station, second information indicating whether to use a CRS port of the at least one adjacent base station, third information indicating whether pieces of multimedia broadcast signal frequency network (MBSFN) configuration information of the at least one adjacent base station are the same as each other, and fourth information indicating whether pieces of time division duplex (TDD) configuration information of the at least one adjacent base station are the same as each other.

14. The electronic device of claim 13, wherein the controller is further configured to perform channel estimation for the CRS based on the common cell information and measure a reception metric for the CRS.

15. The electronic device of claim 14, wherein the reception metric corresponds to one of reference signal received power (RSRP), a signal to interference noise ratio (SINR), a received signal strength index (RSSI), and a received signal received quality (RSRQ).

16. The electronic device of claim 14, wherein the controller is further configured to compare the measured reception metric with a threshold value, and determine that a CRS symbol has been transmitted, when the measured reception metric exceeds the threshold value, and perform interference cancellation on the CRS symbol.

17. The electronic device of claim 16, wherein, when the measured reception metric is less than the threshold value, the controller determines that the CRS symbol has not been transmitted, and bypasses interference cancellation for the CRS symbol.

18. A wireless communication system comprising:
a first base station configured to simultaneously support 5G and long term evolution (LTE) and transmit information for interference cancellation to an electronic device, the information for interference cancellation comprising common cell information that is common to the first base station and at least one adjacent base station;
the at least one adjacent base station configured to support LTE and broadcast a cell-specific reference signal (CRS) directly to the electronic device; and
the electronic device including a communicator configured to receive the information for the interference cancellation and the CRS, a storage configured to store predefined threshold value information, and a controller configured to perform a radio resource control (RRC) connection with the first base station and perform interference cancellation based on the CRS and the information for the interference cancellation comprising the common cell information.

19. The wireless communication system of claim 18, wherein the information for the interference cancellation corresponds to individual cell information at least including an LTE bandwidth, a number of CRS ports, multimedia broadcast signal frequency network (MBSFN) configuration information, and time division duplex (TDD) configuration information for the at least one adjacent base station, and
the controller is further configured to identify a transmission location of a CRS symbol received from the at least one adjacent base station, based on the individual cell information, and perform interference cancellation based on the identified transmission location.

20. The wireless communication system of claim 18, wherein the common cell information includes at least first information indicating a maximum LTE bandwidth value allowed for the at least one adjacent base station, second information indicating whether to use a CRS port of the at least one adjacent base station, third information indicating whether pieces of multimedia broadcast signal frequency network (MBSFN) configuration information of the at least one adjacent base station are the same as each other, and fourth information indicating whether pieces of time division duplex (TDD) configuration information of the at least one adjacent base station are the same as each other, and
the controller is further configured to perform channel estimation for the CRS based on the common cell information, measure a reception metric for the CRS, compare the measured reception metric with a threshold value, determine that a CRS symbol has been transmitted, when the measured reception metric exceeds the threshold value, perform interference cancellation on the CRS symbol, determine that the CRS symbol has not been transmitted, when the measured reception metric is less than the threshold value, and bypass interference cancellation for the CRS symbol.

* * * * *